United States Patent
Ogihara et al.

(10) Patent No.: US 11,201,330 B2
(45) Date of Patent: Dec. 14, 2021

(54) POWER STORAGE DEVICE ELECTRODE, POWER STORAGE DEVICE, AND METHOD OF PRODUCING POWER STORAGE DEVICE ELECTRODE

(71) Applicant: TOYOTA JIDOSHA KABUSHIKI KAISHA, Toyota (JP)

(72) Inventors: Nobuhiro Ogihara, Nagakute (JP); Osamu Hiruta, Nagakute (JP); Yukiyoshi Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 234 days.

(21) Appl. No.: 16/584,802

(22) Filed: Sep. 26, 2019

(65) Prior Publication Data

US 2020/0106100 A1  Apr. 2, 2020

(30) Foreign Application Priority Data

Sep. 27, 2018  (JP) .............. JP2018-181427

(51) Int. Cl.

| H01M 4/60 | (2006.01) |
|---|---|
| H01M 4/485 | (2010.01) |
| H01M 4/587 | (2010.01) |
| H01M 4/139 | (2010.01) |
| H01M 4/62 | (2006.01) |
| H01M 10/36 | (2010.01) |
| H01M 10/0525 | (2010.01) |

(Continued)

(52) U.S. Cl.
CPC .............. *H01M 4/60* (2013.01); *C07F 1/005* (2013.01); *H01M 4/139* (2013.01); *H01M 4/366* (2013.01); *H01M 4/485* (2013.01); *H01M 4/587* (2013.01); *H01M 4/622* (2013.01); *H01M 10/0525* (2013.01)

(58) Field of Classification Search
CPC .. H01M 10/0525; H01M 4/0404; H01M 4/13; H01M 4/139; H01M 4/366; H01M 4/485; H01M 4/587; H01M 4/60; H01M 4/622
See application file for complete search history.

(56) References Cited

U.S. PATENT DOCUMENTS

| 2012/0258360 A1 | 10/2012 | Ogihara |
| 2018/0301290 A1 | 10/2018 | Ogihara |

FOREIGN PATENT DOCUMENTS

| JP | 2003173777 A | 6/2003 |
| JP | 2005093192 A | 4/2005 |

(Continued)

*Primary Examiner* — Carlos Barcena
(74) *Attorney, Agent, or Firm* — Hunton Andrews Kurth LLP

(57) ABSTRACT

A power storage device electrode includes a layered structure having an organic framework layer containing aromatic dicarboxylic acid anions and an alkali metal element layer in which alkali metal elements are coordinated to oxygen atoms contained in the carboxylic acid anion to form a framework as an electrode active material, and in the whole of the electrode active material, a conductive material and a water-soluble polymer, carboxymethyl cellulose as the water-soluble polymer is contained in a range of 1.5 mass % or more and 3.5 mass % or less. In addition, the layered structure is produced by a spray drying method, and the peak intensity ratio when the power storage device electrode is subjected to X-ray diffraction measurement satisfies a predetermined range.

12 Claims, 3 Drawing Sheets

(51) Int. Cl.
*C07F 1/00* (2006.01)
*H01M 4/36* (2006.01)

(56) References Cited

FOREIGN PATENT DOCUMENTS

| | | | |
|---|---|---|---|
| JP | 2005135925 | A | 5/2005 |
| JP | 2011023146 | A | 2/2011 |
| JP | 2012221754 | A | 11/2012 |
| JP | 2013020786 | A | 1/2013 |
| JP | 2013235682 | A | 11/2013 |
| JP | 2017022186 | A | 1/2017 |

POWER STORAGE DEVICE ELECTRODE, POWER STORAGE DEVICE, AND METHOD OF PRODUCING POWER STORAGE DEVICE ELECTRODE

INCORPORATION BY REFERENCE

The disclosure of Japanese Patent Application No. 2018-181427 filed on Sep. 27, 2018 including the specification, drawings and abstract is incorporated herein by reference in its entirety.

BACKGROUND

1. Technical Field

The present disclosure relates to a power storage device electrode, a power storage device and a method of producing a power storage device electrode.

2. Description of Related Art

Regarding power storage devices such as a lithium ion secondary battery, a device in which a layered structure having an organic framework layer containing an aromatic compound which is a dicarboxylic acid anion having two or more aromatic ring structures and an alkali metal element layer in which alkali metal elements are coordinated to oxygen atoms contained in a carboxylic acid anion to form a framework is used as a negative electrode active material has been proposed (for example, refer to Japanese Patent Application Publication No. 2012-221754 (JP 2012-221754 A). The layered structure as the negative electrode active material does not have conductivity but it is unlikely to be soluble in a non-aqueous electrolyte solution and maintains its crystal structure, and thereby the stability of charging and discharging cycle characteristics can be further improved. In addition, in lithium secondary batteries of the related art and the like, an active material, a conductive material, and a binder are sprayed and dried to produce granulated particles (for example, refer to Japanese Patent Application Publication No. 2003-173777 (JP 2003-173777 A), Japanese Patent Application Publication No. 2005-093192 (JP 2005-093192 A), Japanese Patent Application Publication No. 2005-135925 (JP 2005-135925 A), and Japanese Patent Application Publication No. 2013-235682 (JP 2013-235682 A)).

SUMMARY

However, in the above power storage device in JP 2012-221754 A, although the stability of charging and discharging cycle characteristics can be further improved, it is not sufficient and the negative electrode resistance may increase and it is necessary to reduce the resistance. In addition, in JP 2003-173777 A, JP 2005-093192 A, JP 2005-135925 A, and JP 2013-235682 A, the use of a layered structure as an electrode active material was not considered. Accordingly, it is required to improve charging and discharging characteristics of an electrode in which the layered structure is used as an electrode active material.

The present disclosure provides a power storage device electrode, a power storage device, and a method of producing a power storage device electrode through which it is possible to further improve charging and discharging characteristics of an electrode in which a layered structure is used as an electrode active material.

The inventors conducted extensive studies and found that, when a layered structure of an aromatic dicarboxylic acid metal salt is produced by spray drying, the IV resistance can be further reduced and the discharging capacity can be further improved, and thereby completed the present disclosure.

A power storage device electrode according to a first aspect of the present disclosure includes, as an electrode active material, a layered structure having an organic framework layer containing an aromatic compound and an alkali metal element layer in which alkali metal elements are coordinated to oxygen atoms contained in a carboxylic acid anion of the aromatic dicarboxylic acid anion to form a framework as the electrode active material, and in the whole of the electrode active material, a conductive material and a water-soluble polymer containing at least carboxymethyl cellulose (CMC), carboxymethyl cellulose (CMC) is contained in a range of 1.5 mass % or more and 3.5 mass % or less, and at least one of the following conditions (1) to (5) is satisfied:

(1) The peak intensity ratio P(300)/P(111) of the peak intensity of (300) with respect to the peak intensity of (111) when a power storage device electrode is subjected to X-ray diffraction measurement is 2.0 or more,
(2) The peak intensity ratio P(300)/P(011) of the peak intensity of (300) with respect to the peak intensity of (011) in the X-ray diffraction measurement is 2.0 or more,
(3) The peak intensity ratio P(100)/P(111) of the peak intensity of (100) with respect to the peak intensity of (111) in the X-ray diffraction measurement is 6.0 or more,
(4) The peak intensity ratio P(100)/P(011) of the peak intensity of (100) with respect to the peak intensity of (011) in the X-ray diffraction measurement is 5.0 or more, and
(5) The peak intensity ratio P(100)/P(300) of the peak intensity of (100) with respect to the peak intensity of (300) in the X-ray diffraction measurement is 1.5 or more.

A power storage device according to a second aspect of the present disclosure includes a negative electrode which is the power storage device electrode, a positive electrode containing a positive electrode active material, and an ionic conductive medium which is interposed between the positive electrode and the negative electrode to conduct ions.

A third aspect of the present disclosure relates to a method of producing a power storage device electrode. The production method includes spray drying a preparation solution in which aromatic dicarboxylic acid anions and alkali metal cations are dissolved using a spray drying device and thus precipitating a layered structure having an organic framework layer containing a dicarboxylic acid anion having an aromatic framework and an alkali metal element layer in which alkali metal elements are coordinated to oxygen atoms contained in a carboxylic acid anion of the organic framework layer to form a framework, using the layered structure as an electrode active material and obtaining an electrode composite material by mixing carboxymethyl cellulose (CMC) in a range of 1.5 mass % or more and 3.5 mass % or less with respect to the electrode composite material containing the electrode active material, a conductive material and a water-soluble polymer containing at least carboxymethyl cellulose (CMC); and applying the electrode composite material on a current collector such that an electrode composite material layer is formed.

In the power storage device electrode, the power storage device, and the method of producing an electrode active material disclosed herein, when the layered structure is used as an electrode active material, charging and discharging characteristics can be further improved. The reason why such effects are obtained is inferred to be as follows. For example, in the related art, a layered structure can be obtained by a solution mixing method in which an aromatic dicarboxylic acid and an alkali metal are dissolved and a solvent is removed. However, when the electrode is produced by the solution mixing method, the active material is present as a secondary aggregate inside the electrode, and as a result, the active material inside the aggregate and an electrolyte solution cannot form a sufficient interface, and the reaction interface that effectively functions is reduced, which causes an increase in the internal resistance. On the other hand, in the present disclosure, active material particles are produced by spray drying a solution in which an aromatic dicarboxylic acid and an alkali metal are dissolved using a spray drying device (for example, a spray dryer). It is inferred that the active material produced in this method becomes hollow particles having a flake-like layered structure and is easily broken, aggregation of the layered structure is reduced, a structure in which primary particles are extremely highly dispersed inside the electrode can be formed and the internal resistance can be reduced. In addition, when an electrode is produced using the layered structure produced by the spray drying method, depending on the type and composition of a material to be used and the like, the electrode capacity may decrease and the electrode resistance may increase. In the present disclosure, when the water-soluble polymer carboxymethyl cellulose (CMC) is used, for example, processing details are simplified compared to the process using an organic solvent, and an amount of CMC added is in a more favorable range, and charging and discharging characteristics such as the electrode capacity, the electrode resistance, and the like can be made more favorable. Here, the layered structure produced by a spray drying method is oriented when the electrode is produced and has peak intensity ratios in the above ranges.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Power Storage Device Electrode

Figure 1:
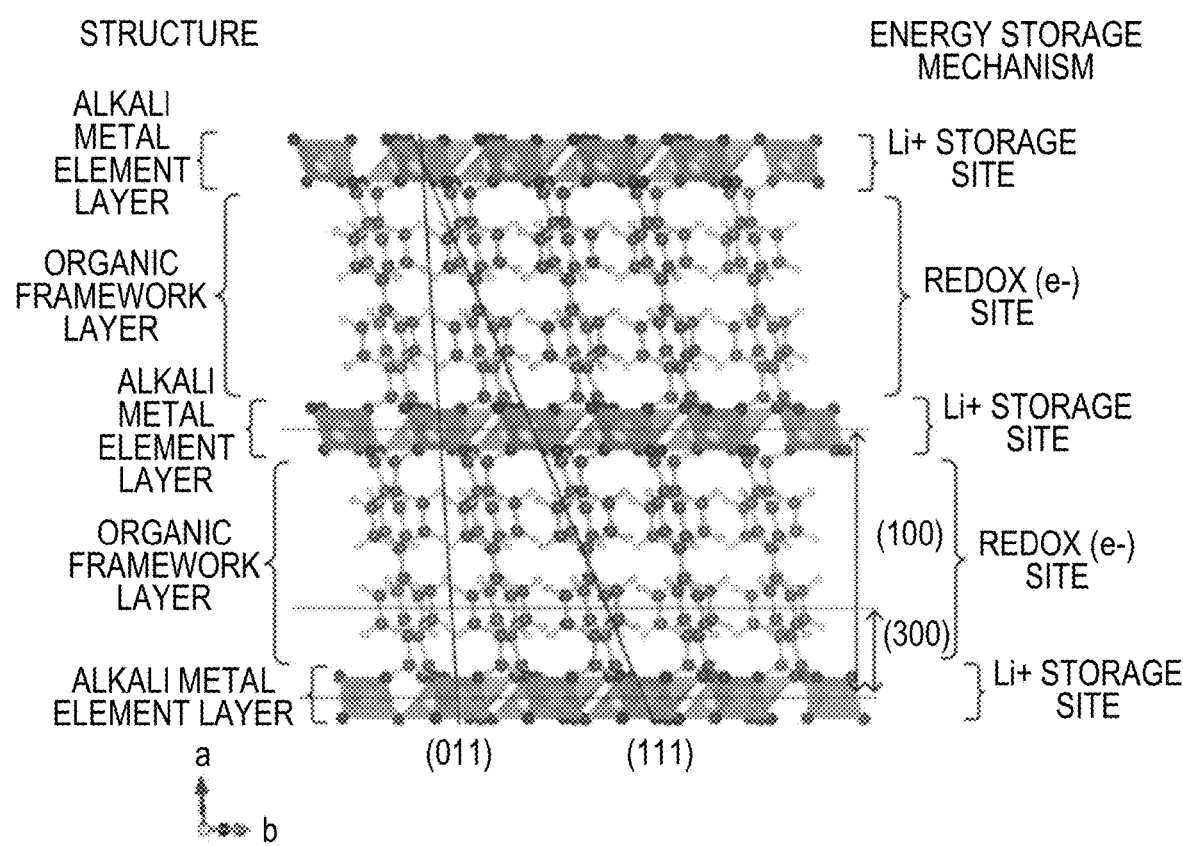
FIG. 1 is an explanatory diagram illustrating an example of a structure of a layered structure.

A power storage device electrode of the present disclosure includes a layered structure having an organic framework layer and an alkali metal element layer as an electrode active material. The electrode active material occludes and releases metal ions which are carriers. Metal ions as carriers are preferably alkali metal ions and one or more of Li ions, Na ions, K ions and the like may be exemplified. The electrode active material includes a layered structure having an organic framework layer containing aromatic dicarboxylic acid anions and an alkali metal element layer in which alkali metal elements are coordinated to oxygen atoms contained in a carboxylic acid of the organic framework layer to form a framework.

The layered structure may have an organic framework layer in which one, two or more aromatic ring structures are connected. Preferably, the layered structure is formed into a layer due to a π electron interaction of an aromatic compound and has a monoclinic type crystal structure belonging to the space group $P2_1/c$ because it is then structurally stable. The layered structure may have a structure represented by one or more of Expressions (1) to (3). Here, in Expressions (1) to (3), a is an integer of 1 or more and 5 or less, b is an integer of 0 or more and 3 or less, and each of these aromatic compounds may have a substituent and a hetero atom in this structure. Specifically, in place of hydrogen in an aromatic compound, a halogen, a chain or cyclic alkyl group, an aryl group, an alkenyl group, an alkoxy group, an aryloxy group, a sulfonyl group, an amino group, a cyano group, a carbonyl group, an acyl group, an amide group, or a hydroxyl group may be included as a substituent, and a structure in which nitrogen, sulfur, or oxygen is introduced in place of carbon in an aromatic compound may be used. The layered structure may have an aromatic compound represented by Expressions (4) and (5). Here, in Expressions (1) to (5), A is an alkali metal. In addition, preferably, the layered structure has a structure of the following Expression (6) in which four oxygen atoms of different dicarboxylic acid anions and alkali metal elements have a 4 coordination form because it is structurally stable. Here, in Expression (6), R has one, two, or more aromatic ring structures, and two or more of a plurality of R's may be the same or one or more thereof may be different from each other. In addition, A is an alkali metal. In this manner, it is preferable to have a structure in which an organic framework layer is bonded due to an alkali metal element.

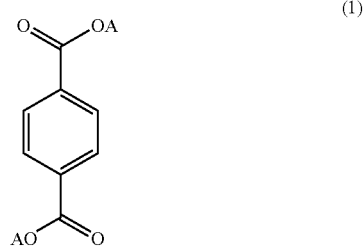

(1)

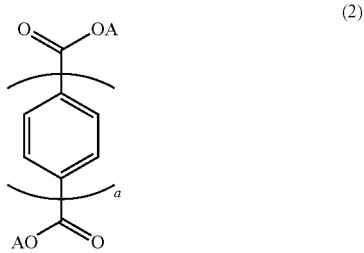

(2)

-continued

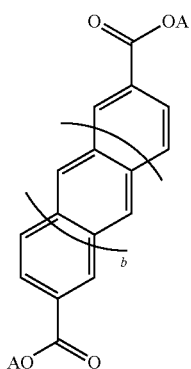

(3)

Here, a is an integer of 2 or more and 5 or less, b is an integer of 0 or more and 3 or less, and each of the aromatic compounds represented by Expressions (1) to (3) may have a substituent and a hetero atom in each of the structures. A is an alkali metal.

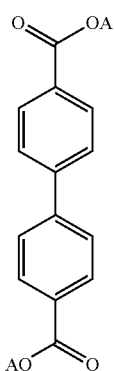

(4)

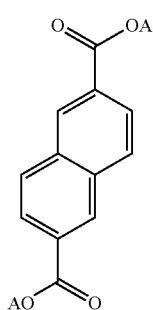

(5)

Here, A is an alkali metal.

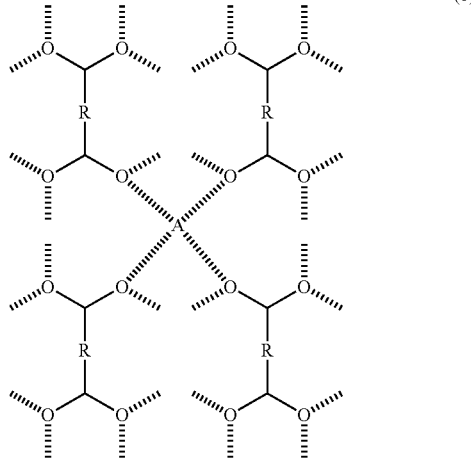

(6)

Here, R has one, two, or more aromatic ring structures, and two or more of a plurality of R's may be the same or one or more thereof may be different from each other. A is an alkali metal.

In the layered structure, when the organic framework layer has two or more aromatic ring structures, for example, an aromatic polycyclic compound in which two or more aromatic rings are bonded such as biphenyl may be used and a condensed polycyclic compound in which two or more aromatic rings are condensed such as naphthalene, anthracene, and pylene may be used. The aromatic ring may be a 5-membered ring, a 6-membered ring, or an 8-membered ring, and is preferably a 6-membered ring. In addition, the number of aromatic rings is preferably 2 or more and 5 or less. When the number of aromatic rings is 2 or more, the layered structure is easily formed and when the number of aromatic rings is 5 or less, the energy density can be further higher. The organic framework layer may have a structure in which one, two or more carboxy anions are bonded to an aromatic ring. The organic framework layer preferably contains an aromatic compound in which the carboxylic acid anions within a dicarboxylic acid anion and the others thereof are bonded at the diagonal position of the aromatic ring structure. The diagonal positions at which carboxylic acids are bonded may be positions at which a distance from a bonding position of one carboxylic acid to a bonding position of another carboxylic acid is farthest and, for example, they may be the 4,4' positions if the aromatic ring structure is biphenyl and they may be the 2,6 positions if the aromatic ring structure is naphthalene.

For example, as shown in FIG. 1, in the alkali metal element layer, alkali metal elements are coordinated to oxygen atoms contained in the carboxylic acid anion to form a framework. FIG. 1 is an explanatory diagram illustrating an example of a structure of a layered structure, with 4,4'-biphenyldicarboxylic acid dilithium as a specific example. The alkali metal contained in the alkali metal element layer can be, for example, any one or more of Li, Na, K and the like, and Li is preferable. Here, metal ions which are carriers for a power storage device and are occluded in and released from the layered structure due to charging and discharging may be different from or the same as alkali metal elements contained in the alkali metal element layer, and, for example, can be any 1 or more of Li, Na, and K. In addition, since alkali metal elements contained in the alkali metal element layer form a framework of a layered structure, it is inferred that they are not related to ion transfer according to charging and discharging, that is, they are not occluded or released during charging and discharging. As shown in FIG. 1, the layered structure configured in this manner is formed of a Li layer (an alkali metal element layer) between an organic framework layer and an organic framework layer in the structure. In an energy storage mechanism, it is thought that the organic framework layer of the layered structure functions as a redox ($e^-$) site, but the alkali metal element layer functions as an occlusion site (alkali metal ion occlusion site) of metal ions as a carrier. For example, the layered structure is preferably one or more of a 2,6-naphthalenedicarboxylic acid alkali metal salt, a 4,4'-biphenyldicarboxylic acid alkali metal salt and a terephthalic acid alkali metal salt, and more preferably a 4,4'-biphenyldicarboxylic acid alkali metal salt.

The layered structure is produced by a spray drying method of spray drying a solution containing an aromatic dicarboxylic acid anion and an alkali metal cation, and has a hollow spherical structure formed by incorporating a collection of flakes of the layered structure during production. The power storage device electrode is oriented in a predetermined crystal plane because the hollow spherical structure is broken and a flake-like layered structure is used. In the power storage device electrode, when the electrode is subjected to X-ray diffraction measurement, a peak intensity ratio P(300)/P(111) of the peak intensity of (300) with respect to the peak intensity of (111) may be 2.0 or more. That is, the peak intensity of (300) may be at least twice the peak intensity of the peak intensity of (111). The intensity ratio is more preferably 2.5 or more and most preferably 3.0 or more. In addition, the intensity ratio may be 5.0 or less. In this range, a layer spacing of the layered structure and the like are favorable, and the electrode resistance can be further reduced. In addition, in the power storage device electrode, when the electrode is subjected to X-ray diffraction measurement, a peak intensity ratio P(300)/P(011) of the peak intensity of (300) with respect to the peak intensity of (011) in the X-ray diffraction measurement may be 2.0 or more. That is, the peak intensity of (300) may be at least twice the peak intensity of (011). The intensity ratio is more preferably 2.5 or more and most preferably 3.0 or more. In addition, the intensity ratio may be 5.0 or less. In this range, a layer spacing of the layered structure and the like are favorable, and the electrode resistance can be further reduced. In addition, in the power storage device electrode, when the electrode is subjected to X-ray diffraction measurement, the peak intensity ratio P(100)/P(111) of the peak intensity of (100) with respect to the peak intensity of (111) in the X-ray diffraction measurement may be 6.0 or more. That is, the peak intensity of (100) may be at least 6 times the peak intensity of (111). The intensity ratio is more preferably 6.5 or more and most preferably 6.6 or more. In addition, the intensity ratio may be 10.0 or less. In this range, a layer spacing of the layered structure and the like are favorable, and the electrode resistance can be further reduced. In addition, in the power storage device electrode, when the electrode is subjected to X-ray diffraction measurement, the peak intensity ratio P(100)/P(011) of the peak intensity of (100) with respect to the peak intensity of (011) may be 5.0 or more. That is, the peak intensity of (100) may be at least 5 times the peak intensity of (011). The intensity ratio is more preferably 6.0 or more and most preferably 6.5 or more. In addition, the intensity ratio may be 10.0 or less. In this range, a layer spacing of the layered structure and the like are favorable, and the electrode resistance can be further reduced. In addition, in the power storage device electrode, when the electrode is subjected to X-ray diffraction measurement, the peak intensity ratio P(100)/P(300) of the peak intensity of (100) with respect to (300) may be 1.5 or more. That is, the peak intensity of (100) may be at least once the peak intensity of (300). The intensity ratio is more preferably 1.8 or more and most preferably 2.0 or more. In addition, the intensity ratio may be 5.0 or less. In this range, a layer spacing of the layered structure and the like are favorable, and the electrode resistance can be further reduced. In addition, in the power storage device electrode, when the electrode is subjected to X-ray diffraction measurement, as described above, in the power storage device electrode, small flakes of the active material present in the electrode are specifically oriented, and the peak intensity corresponding to the n00 plane tends to be larger. In addition, when the surface is observed under a scanning electron microscope, the power storage device electrode may have a smooth surface. Since the electrode active material can be easily broken and flakes can be highly dispersed in the electrode, the surface of the electrode becomes smoother. Particularly, the power storage device electrode in which the peak intensity ratio is satisfied may contain a 4,4'-biphenyldicarboxylic acid alkali metal salt.

In the power storage device electrode, an electrode composite material layer containing the above layered structure as an electrode active material, a water-soluble polymer, and a conductive material may be formed on a current collector. The electrode composite material contains a water-soluble polymer. The water-soluble polymer may contain at least carboxymethyl cellulose (CMC) and may contain a polyvinyl alcohol. The water-soluble polymer may serve as a binder for connecting active material particles and conductive material particles. Carboxymethyl cellulose may be, for example, an inorganic salt in which the terminal of a carboxymethyl group is sodium, calcium, or the like, and an ammonium salt in which the terminal of a carboxymethyl group is ammonium. The electrode composite material contains the water-soluble polymer carboxymethyl cellulose in a range of 1.5 mass % or more and 3.5 mass % or less within all of the electrode active material, the conductive material, and the water-soluble polymer (hereinafter referred to as the entire electrode composite material). When the content of carboxymethyl cellulose is 1.5 mass % or more, dispersion of the substance contained in the electrode composite material is sufficient and the electrode resistance can be further reduced. In addition, when the content of carboxymethyl cellulose is 3.5 mass % or less, the occurrence of electronic path inhibition can be further reduced and the electrode resistance can be further reduced. When the content of CMC is in this range, the electrode resistance can be further reduced and the electrode capacity can be further improved. In addition, the electrode composite material may contain less than 2.0 mass % of carboxymethyl cellulose in the entire electrode composite material. More preferably, the power storage device electrode may contain carboxymethyl cellulose as a water-soluble polymer in a range of 1.8 mass % or more and 2.5 mass % or less. In this range, the electrode resistance can be further reduced and the electrode capacity can be further improved.

Preferably, the power storage device electrode contains polyethylene oxide (PEO) as a water-soluble polymer in addition to carboxymethyl cellulose. Polyethylene oxide is preferably included because it is then easy to apply the electrode composite material. Polyethylene oxide as the water-soluble polymer is preferably contained in a range of 6 mass % or more and 9 mass % or less in the entire electrode composite material. In addition, a water-soluble polymer containing CMC and PEO in a range of 8 mass % or more and 12 mass % or less in the entire electrode composite material is preferably included in the electrode. The molecular weight of polyethylene oxide is preferably 500,000 or more, more preferably 1,000,000 or more, and most preferably 2,000,000 or more. When the molecular weight is 500,000 or more, a more favorable function is provided. The molecular weight may be in a range of 3,000,000 or less. In addition, the power storage device electrode may contain a styrene butadiene copolymer. The styrene butadiene copolymer may serve as a binder for connecting active material particles and conductive material particles. The styrene butadiene copolymer is preferably included in the electrode in a range of 8 mass % or less. When the content is 8 mass % or less, since the amount of the active material, the conductive material, and the water-soluble polymer is not too small, functions of the active material, the conductive material, and the water-soluble polymer can be sufficiently exhibited. In addition, the power storage device electrode may also contain a binder in addition to the above water-soluble polymer. Examples of the binder include a fluorine-containing resin such as polytetrafluoroethylene (PTFE), polyvinylidene fluoride (PVdF), and fluorine rubber, a thermoplastic resin such as polypropylene and polyethylene, ethylene-propylene-diene-monomer (EPDM) rubber, sulfonated EPDM rubber, and natural butyl rubber (NBR). These can be used alone or two or more types thereof can be used in combination.

The power storage device electrode preferably contains a conductive material. The conductive material is not particularly limited as long as it is an electron conductive material that does not adversely affect the battery performance, and, for example, graphite such as natural graphite (flaky graphite, scaly graphite) and artificial graphite, carbon materials such as acetylene black, carbon black, Ketjen black, carbon whisker, needle coke, and carbon fibers, and metals (copper, nickel, aluminum, silver, gold, etc.) can be used alone or two or more thereof can be used in combination. Among these, the conductive material is preferably carbon black or acetylene black in consideration of the electron conductivity and coating properties. In the power storage device electrode, the content of the conductive material in the entire electrode composite material is preferably in a range of 5 mass % or more and 25 mass % or less, and may be 10 mass % or more and may be 15 mass % or more. When the content is 5 mass % or more, sufficient conductivity can be imparted to the electrode and deterioration of charging and discharging characteristics can be reduced. In addition, when the content is 25 mass % or less, since the amount of the active material and the water-soluble polymer is not too small, functions of the active material and the water-soluble polymer can be sufficiently exhibited.

The power storage device electrode preferably contains a larger amount of the electrode active material, and the content of the electrode active material in the entire electrode composite material is preferably 65 mass % or more and more preferably 70 mass % or more and may be 75 mass % or more. In addition, the content of the electrode active material may be in a range of 85 mass % or less or 75 mass % or less. When the electrode active material is contained in a range of 85 mass % or less, since the amount of the conductive material and the water-soluble polymer is not too small, functions of the conductive material and the water-soluble polymer can be sufficiently exhibited.

In the power storage device electrode, preferably, the electrode composite material is formed into a paste form or a clay form using a solvent to form a current collector. Water may be used as the solvent, and, for example, an organic solvent such as N-methyl pyrrolidone, dimethylformamide, dimethyl acetamide, methyl ethyl ketone, cyclohexanone, methyl acetate, methyl acrylate, diethylene triamine, N,N-dimethylaminopropylamine, ethylene oxide, and tetrahydrofuran may be used. Here, since the water-soluble polymer is used, water is suitable. Regarding the current collector, in addition to copper, nickel, stainless steel, titanium, aluminum, sintered carbon, a conductive polymer, conductive glass, and an Al—Cd alloy, in order to improve the adhesiveness, the conductivity, and the resistance to reduction, for example, copper of which the surface is treated with carbon, nickel, titanium, silver or the like can be used. Among these, the current collector of the power storage device electrode is more preferably made of aluminum metal. That is, the layered structure is preferably formed on a current collector made of aluminum metal. Aluminum is abundant and has excellent corrosion resistance. For these, the surface can be oxidized. Regarding the shape of the current collector, a foil-like, film-like, sheet-like, net-like, punched or expanded lath component, porous component, foamed component, and fiber group-formed component may be exemplified. The thickness of the current collector is, for example, 1 to 500 μm.

Method of Producing a Power Storage Device Electrode

A method of producing a power storage device electrode of the present disclosure is a method of producing the above power storage device electrode. The production method may include a solution preparing process, a precipitating process, a composite material producing process, and a forming process. Here, a preparation solution may be separately prepared, and the solution preparing process may be omitted. In addition, in this production method, other processes may be added. For example, a method of producing a power storage device electrode may further include one or more of a firing process in which an electrode is fired under an inert atmosphere and a doping process in which an electrode active material of an electrode is doped with alkali metal ions after the forming process.

In the solution preparing process, a preparation solution in which aromatic dicarboxylic acid anions and alkali metal cations are dissolved is prepared. The solvent for the preparation solution is not particularly limited, and an aqueous solvent may be used or an organic solvent may be used, and water is preferable. In the process, it is preferable to prepare a preparation solution in which the concentration of the aromatic dicarboxylic acid anion is 0.1 mol/L or more and more preferably 0.2 mol/L or more. In addition, in this process, it is preferable to prepare a preparation solution in which the concentration of the aromatic dicarboxylic acid anion is 5 mol/L or less. In this concentration range, it is easy to perform spray drying in the next process. In addition, in this process, aromatic dicarboxylic acid anions having an organic framework in which a benzene ring, naphthalene, biphenyl, a naphthalene framework or a biphenyl framework is extended may be used. The anion preferably has a biphenyl framework. In addition, in this process, aromatic dicarboxylic acid anions having a structure represented by at least one of the above Expressions (1) to (3) may be used. When these aromatic dicarboxylic acid anions are used, a layered structure containing them can be precipitated in the next process. In addition, in this process, it is preferable to prepare a preparation solution containing one or more alkali metal cations among lithium, sodium and potassium. In this process, for example, it is preferable to obtain a preparation solution having a molar ratio B/A of 2.2 or more which is the number of moles B(mol) of alkali metal cations with respect to the number of moles A(mol) of aromatic dicarboxylic acid anions. In this manner, it is preferable that alkali metal cations be in excess because then the resistance of the power storage device electrode can be further reduced. The molar ratio B/A may be 2.5 or more. In addition, the molar ratio B/A may be 3.0 or less.

In the precipitating process, the preparation solution is spray dried using a spray drying device to precipitate the layered structure. The layered structure is the same as described in the above power storage device electrode and has an organic framework layer containing aromatic dicarboxylic acid anions and an alkali metal element layer in which alkali metal elements are coordinated to oxygen atoms contained in a carboxylic acid anion of the organic framework layer to form a framework. In the precipitating process, the preparation solution prepared in the solution preparing process is used. Spray drying may be performed by a spray dryer. Spray drying conditions may be appropriately adjusted depending on, for example, the size of the device and the amount of the electrode active material to be produced. The drying temperature is preferably, for example, a range of 100° C. or higher and 250° C. or lower. When the temperature is 100° C. or higher, the solvent can be sufficiently removed. The temperature is preferably 220° C. or lower because the energy consumption can be further reduced. The drying temperature is more preferably 120° C. or higher and 150° C. or higher and more preferably 200° C. or lower. In addition, the amount of a liquid supplied depends on the size for production and may be, for example, in a range of 0.1 L/h or more and 2 L/h or less. In addition, the size of the nozzle through which the preparation solution is sprayed depends on the size for production and may be, for example, in a diameter range of 0.5 mm or more and 5 mm or less. Thus, when spray drying is performed to produce a layered structure, an electrode active material having the above hollow spherical structure including the layered structure is obtained.

In the composite material producing process, the layered structure produced by the spray drying method is used as an electrode active material, and an electrode composite material in which the electrode active material, the water-soluble polymer, and the conductive material are mixed is produced. In this process, an electrode composite material in which carboxymethyl cellulose as the water-soluble polymer is mixed into the entire electrode composite material in a range of 1.5 mass % or more and 3.5 mass % or less is obtained. In this process, it is preferable to add carboxymethyl cellulose as the water-soluble polymer in a range of 1.8 mass % or more and 2.5 mass % or less. In addition, in this process, carboxymethyl cellulose in the entire electrode composite material may be added in a range of less than 2.0 mass %. In addition, for the water-soluble polymer, it is preferable to further include polyethylene oxide. The polyethylene oxide is preferably added in a range of 6 mass % or more and 9 mass % or less in the entire electrode composite material. In addition, the water-soluble polymer may contain a polyvinyl alcohol. Preferably, the entire water-soluble polymer is added in a range of 8 mass % or more and 12 mass % or less in the entire electrode composite material. The content of the electrode active material is preferably 65 mass % or more, more preferably 70 mass % or more, and may be 75 mass % or more in the entire electrode composite material. In addition, there may be in a range of 85 mass % or less or 75 mass % or less of the electrode active material in the entire electrode composite material. Regarding the conductive material, the content of a conductive material is preferably in a range of 5 mass % or more and 25 mass % or less in the entire electrode composite material and may be 10 mass % or more or 15 mass % or more. In this process, preferably, a solvent is added to the electrode composite material to make a paste form or a clay form. Water may be used as the solvent, and the above organic solvents may be used, but water is more preferable. This is because there is no need to collect the solvent. In addition, regarding the conductive material, other binders and the like used in this process, those described in the power storage device electrode can be appropriately used.

In the forming process, a process of applying the electrode composite material on the current collector is performed. Examples of a method of forming an electrode composite material include roller coating such as an applicator roll, screen coating, a doctor blade method, spin coating, and a bar coater, and any of these can be used to form any thickness and shape. In addition, the electrode composite material may be formed into a clay form and pressure-bonded to a dielectric substance. Regarding the current collector used in this process, those described in the power storage device electrode can be appropriately used.

Power Storage Device

The power storage device of the present disclosure includes a negative electrode which is the above power storage device electrode, a positive electrode containing a positive electrode active material, and an ionic conductive medium which is interposed between the positive electrode and the negative electrode to conduct ions. Examples of the power storage device include an electric double layer capacitor, a hybrid capacitor, a pseudo electric double layer capacitor, and a lithium ion battery.

Regarding the positive electrode, a known positive electrode used for a capacitor, a lithium ion capacitor, and the like may be used. The positive electrode may contain, for example, a carbon material as a positive electrode active material. The carbon material is not particularly limited, and examples thereof include activated carbons, cokes, glass carbons, graphite, non-graphitizable carbons, pyrolytic carbons, carbon fibers, carbon nanotubes, and polyacenes. Among these, activated carbons having a large specific surface area are preferable. The specific surface area of the activated carbon as a carbon material is preferably 1,000 $m^2/g$ or more and more preferably 1,500 $m^2/g$ or more. When the specific surface area is 1,000 $m^2/g$ or more, the discharging capacity can be further increased. The specific surface area of the activated carbon is preferably 3,000 $m^2/g$ or less and more preferably 2,000 $m^2/g$ or less in consideration of ease of production. Here, it is thought that, in the positive electrode, at least one of the anions and the cations contained in the ionic conductive medium are adsorbed or detached to store power, and additionally, at least one of the anions and the cations contained in the ionic conductive medium may be inserted or detached to store power.

Alternatively, regarding the positive electrode, a positive electrode used for a general lithium ion battery may be used. In this case, regarding the positive electrode active material, a sulfide containing a transition metal element, an oxide containing lithium and a transition metal element, and the like can be used. Specifically, a transition metal sulfide such as $TiS_2$, $TiS_3$, $MoS_3$, and $FeS_2$, a lithium manganese complex oxide having a basic composition formula of $Li_{(1-x)}MnO_2$ ($0<x<1$, etc., hereinafter the same), $Li_{(1-x)}Mn_2O_4$, or the like, a lithium cobalt complex oxide having a basic composition formula of $Li_{(1-x)}CoO_2$ or the like, a lithium nickel complex oxide having a basic composition formula of $Li_{(1-x)}NiO_2$ or the like, a lithium nickel cobalt manganese complex oxide having a basic composition formula of $Li_{(1-x)}Ni_aCo_bMn_cO_2$ ($a+b+c=1$) or the like, a lithium vanadium complex oxide having a basic composition formula of $LiV_2O_3$ or the like, and a transition metal oxide having a basic composition formula of $V_2O_5$ or the like can be used. In addition, the positive electrode active material may be a lithium iron phosphate. Among these, a lithium transition metal complex oxide, for example, $LiCoO_2$, $LiNiO_2$, $LiMnO_2$, or $LiV_2O_3$ is preferable. Here, the term "basic composition formula" is intended to include other elements.

The positive electrode may be formed, for example, by mixing the above positive electrode active material, conductive material, and binder, adding an appropriate solvent to form a paste-like positive electrode composite material and applying the material to the surface of the current collector and performing drying, and as necessary, performing compressing to increase the electrode density. Regarding the conductive material, binder, solvent, and current collector used for the positive electrode, for example, those exemplified in the power storage device electrode can be appropriately used.

In the power storage device, the ionic conductive medium may be, for example, a non-aqueous electrolyte solution containing a supporting salt (supporting electrolyte) and an organic solvent. Regarding the supporting salt, for example, when a carrier is lithium ions, those containing a known lithium salt may be used. Examples of the lithium salt include $LiPF_6$, $LiBF_4$, $LiClO_4$, $LiAsF_6$, $Li(CF_3SO_2)_2N$, and $LiN(C_2F_5SO_2)_2$. Among these, $LiPF_6$ or $LiBF_4$ is preferable. The concentration of the supporting salt in the non-aqueous electrolyte solution is preferably 0.1 mol/L or more and 5 mol/L or less and more preferably 0.5 mol/L or more and 2 mol/L or less. When the concentration at which the supporting salt is dissolved is 0.1 mol/L or more, a sufficient current density can be obtained, and when the concentration is 5 mol/L or less, an electrolyte solution can be made more stable. In addition, a phosphorus-based or halogen-based flame retardant may be added to the non-aqueous electrolyte solution. Regarding the organic solvent, for example, an aprotic organic solvent can be used. Examples of such an organic solvent include a cyclic carbonate, a chain carbonate, a cyclic ester, a cyclic ether, and a chain ether. Examples of the cyclic carbonate include ethylene carbonate, propylene carbonate, butylene carbonate, and vinylene carbonate. Examples of the chain carbonate include dimethyl carbonate, diethyl carbonate, and methyl ethyl carbonate. Examples of the cyclic ester carbonate include gamma butyrolactone and gamma valerolactone. Examples of the cyclic ether include tetrahydrofuran and 2-methyltetrahydrofuran. Examples of the chain ether include dimethoxyethane and ethylene glycol dimethyl ether. These may be used alone or a plurality of thereof may be used in combination. In addition, regarding the non-aqueous electrolyte solution, in addition thereto, a nitrile solvent such as acetonitrile and propyl nitrile, an ionic liquid, a gel electrolyte and the like may be used. In addition, the ionic conductive medium may be a solid electrolyte.

The power storage device may have a separator between the positive electrode and the negative electrode. The separator is not particularly limited as long as it has a composition that can withstand a usage range of the power storage device. For example, polymer non-woven fabrics such as a polypropylene non-woven fabric and a polyphenylene sulfide non-woven fabric and microporous films of an olefin resin such as polyethylene and polypropylene may be used. These may be used alone or used in combination.

Figure 2:
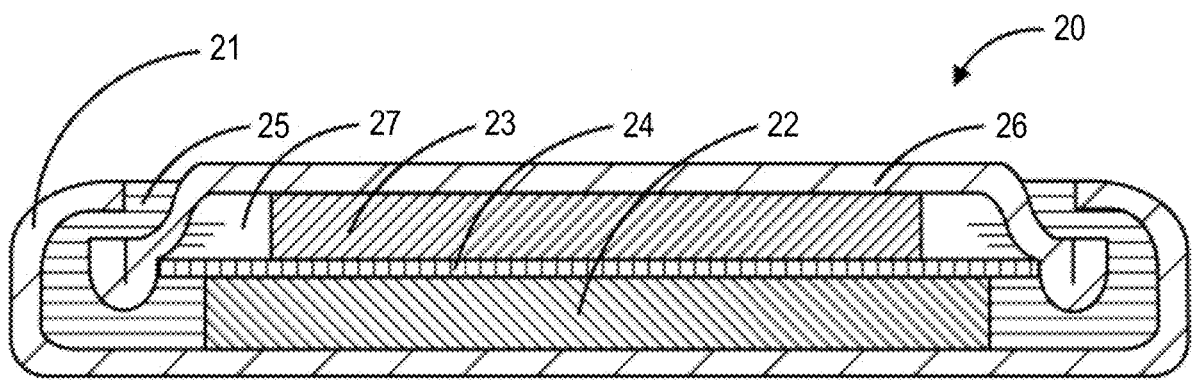
FIG. 2 is an explanatory diagram illustrating an example of a power storage device 20.

The shape of the power storage device is not particularly limited, and examples thereof include a coin type, a button type, a sheet type, a laminated type, a cylindrical type, a flat type, and a rectangular type. In addition, it may be applied to large devices used for an electric automobile and the like. FIG. 2 is a schematic diagram illustrating an example of a power storage device 20. The power storage device 20 includes a battery case 21 having a cup shape, a positive electrode 22 which contains a positive electrode active material and is provided at the bottom of the battery case 21, a negative electrode 23 which contains a negative electrode active material and is provided at a position that faces the positive electrode 22 with a separator 24 therebetween, a gasket 25 formed of an insulating material, and a sealing plate 26 which is provided at the opening of the battery case 21 and seals the battery case 21 via the gasket 25. In the power storage device 20, an ionic conductive medium 27 is filled into a space between the positive electrode 22 and the negative electrode 23. In addition, the negative electrode 23 includes the layered structure of the aromatic dicarboxylic acid metal salt described above as a negative electrode active material.

In the methods of producing a power storage device electrode, a power storage device and an electrode active material described in detail above, when the layered structure is used as the electrode active material, charging and discharging characteristics can be further improved. The reason why such effects are obtained is inferred to be as follows. For example, in the related art, a layered structure can be obtained by a solution mixing method in which an aromatic dicarboxylic acid and an alkali metal are dissolved and a solvent is removed. However, when the electrode is produced by the solution mixing method, the active material is present as a secondary aggregate inside the electrode, and as a result, the active material inside the aggregate and an electrolyte solution cannot form a sufficient interface, and the reaction interface that effectively functions is reduced, which causes an increase in the internal resistance. On the other hand, in the present disclosure, a solution in which an aromatic dicarboxylic acid and an alkali metal are dissolved is sprayed and dried using a spray dryer to produce active material particles. It is inferred that the active material produced in this method becomes hollow particles having a flake-like layered structure and is easily broken, aggregation of the layered structure is reduced, a structure in which primary particles are extremely highly dispersed inside the electrode can be formed and the internal resistance can be reduced. In addition, when an electrode is produced using the layered structure produced by the spray drying method, depending on the type and composition of a material to be used and the like, the electrode capacity may decrease and the electrode resistance may increase. In the present disclosure, when carboxymethyl cellulose (CMC) as a water-soluble polymer is used, for example, processing details are simplified compared to the process using an organic solvent, and an amount of CMC added is in a more favorable range, and charging and discharging characteristics such as the electrode capacity, the electrode resistance, and the like can be made more favorable.

Here, the present disclosure is not limited to the above embodiments, and can be implemented in various forms within the technical scope of the present disclosure.

Hereinafter, specific production examples of the power storage device of the present disclosure will be described. First, examples in which a layered structure is synthesized by a spray drying method and a solution mixing method, and an electrode is produced and evaluated will be described as a reference example.

Reference Example 1

Electrode Active Material: Synthesis of a Layered Structure of 4,4'-biphenyldicarboxylic Acid Dilithium A layered structure was produced by a spray drying method. In order to synthesize 4,4'-biphenyldicarboxylic acid dilithium, 4,4'-biphenyldicarboxylic acid and lithium hydroxide monohydrate (LiOH.H$_2$O) were used as starting materials. 0.44 mol/L of lithium hydroxide was added to water and stirred to prepare an aqueous solution. Then, the aqueous solution was prepared so that the molar ratio B/A, which is the number of moles B(mol) of lithium hydroxide to the number of moles A(mol) of 4,4'-biphenyldicarboxylic acid, was 2.2, that is, the concentration of 4,4'-biphenyldicarboxylic acid was 0.20 mol/L. The prepared aqueous solution was sprayed and dried using a spray dryer (Mini Spray Dryer B-290, commercially available from Japan Buchi) to precipitate 4,4'-biphenyldicarboxylic acid dilithium. The nozzle diameter of the spray dryer used was 1.4 mm, the amount of the solution sprayed was 0.4 L/hour, the drying temperature was 150° C., and lithium 4,4'-biphenyldicarboxylate was synthesized.

Electrode: Production of 4,4'-biphenyldicarboxylic Acid Dilithium Electrode

Here, 79 mass % of lithium 4,4'-biphenyldicarboxylate produced in the above method, 14 mass % of carbon black (TB5500 commercially available from Tokai Carbon Co., Ltd.) as a particulate carbon conductive material, 2.8 mass % of a polyvinyl alcohol (Gohsenx, T-330, commercially available from The Nippon Synthetic Chemical Industry Co., Ltd.) as a water-soluble polymer, and 4.2 mass % of a styrene butadiene copolymer (BM-400B commercially available from Zeon Corporation) were mixed, and an appropriate amount of water as a dispersant was added and dispersed to form a slurry-like composite material. The slurry-like composite material was uniformly applied to a copper foil current collector with a thickness of 10 μm so that the amount of the 4,4'-biphenyldicarboxylic acid dilithium active material per unit area was 3 mg/cm$^2$ and vacuum-heated and dried at 120° C. to produce a coating sheet. Then, the coating sheet was subjected to pressure press processing and punched into an area of 2 cm$^2$ to prepare a disk-shaped electrode.

Power Storage Device: Production of Bipolar Evaluation Cell

Here, 1.0 mol/L of lithium hexafluorophosphate as a supporting electrolyte was added to a non-aqueous solvent in which ethylene carbonate (EC), dimethyl carbonate (DMC), and ethyl methyl carbonate (EMC) were mixed at a volume ratio of 30:40:30 to produce a non-aqueous electrolyte solution. The 4,4'-biphenyldicarboxylic acid dilithium electrode produced in the above method was used as a working electrode, the lithium metal foil (with a thickness of 300 μm) was used as a counter electrode, and a separator (commercially available from Toray Industries Inc.) impregnated with the non-aqueous electrolyte solution was interposed between both electrodes to produce a bipolar evaluation cell.

Reference Examples 2 to 4

Reference Example 2 was obtained in the same manner as in Reference Example 1 except that vacuum-drying was performed at 120° C. using a spray dryer after 4,4'-biphenyldicarboxylic acid dilithium was synthesized. Reference Example 3 was obtained in the same manner as in Reference Example 1 except that an aqueous solution was prepared at a molar ratio of lithium hydroxide with respect to 4,4'-biphenyldicarboxylic acid of 2.5 and synthesized using a spray dryer. In addition, Reference Example 4 was obtained in the same manner as in Reference Example 3 except that vacuum-drying was performed at 120° C. using a spray dryer after lithium 4,4'-biphenyldicarboxylate was synthesized.

Reference Example 5

A layered structure was produced by a solution mixing method. 4,4'-biphenyldicarboxylic acid and lithium hydroxide monohydrate (LiOH.H$_2$O) were used as starting materials, methanol (100 mL) was added to lithium hydroxide monohydrate (0.556 g) and stirred and then 1.0 g of 4,4'-biphenyldicarboxylic acid was added thereto and stirred for 1 hour. Then, after stirring, the solvent was removed, and drying was performed under a vacuum at 150° C. for 16 hours, and thereby lithium 4,4'-biphenyldicarboxylate as a white powder sample was obtained. The same treatments as in Reference Example 1 were performed except that this was used to obtain Reference Example 1.

X-Ray Diffraction Measurement

The electrode active materials and electrodes of Reference Examples 1 to 5 were subjected to X-ray diffraction measurement. The measurement was performed using CuKα rays (with a wavelength of 1.54051 Å) as radioactive rays and an X-ray diffraction device (UltimaIV commercially available from Rigaku Corporation). In addition, in the measurement, a single crystal monochromator of graphite was used to monochromatise X-rays, an applied voltage was set to 40 kV, a current was set to 30 mA, and a scanning speed was set to 5°/min, scanning was performed on the electrode active material in an angle range of 2θ=5° to 60° and scanning was performed on the electrode in an angle range of 2θ=5° to 30°.

Evaluation of Charging and Discharging Characteristics

A capacity obtained by reducing the bipolar evaluation cell produced above to 0.5 V at 0.1 mA under a temperature environment of 20° C. was set as a discharging capacity. In addition, thereafter, a capacity obtained by oxidizing to 1.5 V at 0.1 mA was set as a charging capacity. In addition, using the obtained charging and discharging curve, a differential value of a charging and discharging curve was calculated with respect to a potential difference to obtain a differential curve. In addition, a charging and discharging polarization was calculated from a peak difference between two different internal resistance differential curves in this differential curve, and the IV resistance was calculated in consideration of an applied current. Here, the charging and discharging curve of the 2nd cycle was used for the IV resistance.

Results and Considerations

Figure 3:
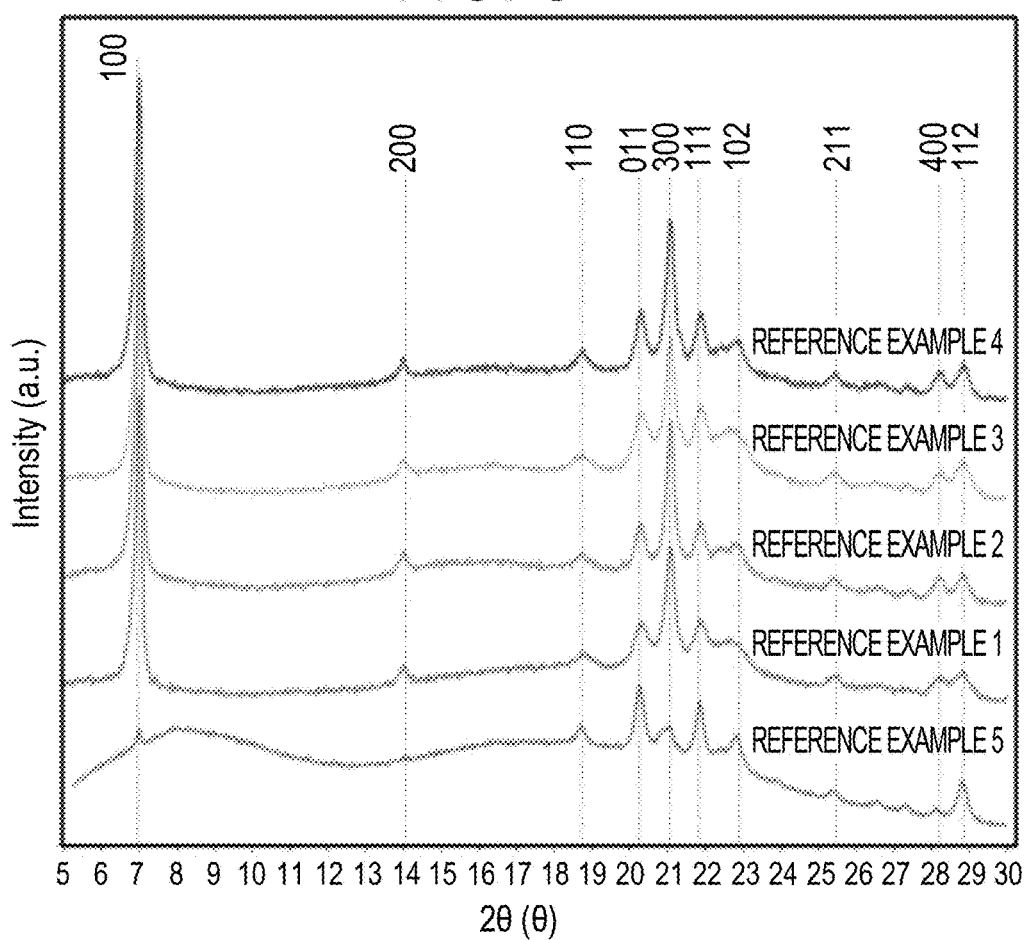
FIG. 3 shows XRD measurement results of electrodes of Reference Examples 1 to 5.

The methods of producing Reference Examples 1 to 5, the peak intensity ratio of the electrode, and the IV resistance value are summarized in Table 1. In addition, FIG. 3 shows XRD measurement results of electrodes of Reference Examples 1 to 5. As shown in FIG. 3, in the electrodes of Reference Examples 1 to 4 containing the electrode active material produced by the spray drying method, regardless of whether the active material was vacuum-dried at 120° C., a peak appeared at the 2θ position as in a solution mixing method of the related art. This was thought that, since vacuum-drying was performed at 120° C. after the electrode was produced, the same effects as in vacuum drying of the active material at 120° C. were obtained. In the peak intensity, in the electrode produced by a spray drying method, the peak intensity corresponding to the n00 plane tended to increase. This indicates that small flakes of the active material present inside the electrode were specifically oriented. In particular, it was found that, in the electrodes of Reference Examples 1 to 4, in X-ray diffraction measurement, the peak intensity of (300) was at least twice the peak intensity of (111) or (011), and the peak intensity of (100) was at least 5 times the peak intensity of (111) or (011). Specifically, the peak intensity ratio P(300)/P(111) was 2.0 or more, P(300)/P(011) was 2.0 or more, P(100)/P(111) was 6.0 or more, P(100)/P(011) was 5.0 or more, and P(100)/P(300) was 1.5 or more. It was inferred that, when any one of the peak intensity ratios was 1 or more, it could be estimated as a piece-like oriented active material. In addition, as shown in Table 1, it was found that, in the electrode produced with the layered structure synthesized by a spray drying method, the IV resistance was further reduced compared to the solution mixing method.

results of X-ray diffraction of the electrode as in Reference Examples 1 to 4 were obtained.

Production of 4,4'-biphenyldicarboxylic Acid Dilithium Negative Electrode

Here, 73.4 mass % of 4,4'-biphenyldicarboxylic acid dilithium (Bph) produced by a spray drying method, 18.3 mass % of carbon black (TB5500 (with a diameter of about 50 nm) commercially available from Tokai Carbon Co., Ltd.) as a conductive material, 3.7 mass % of carboxymethyl cellulose (CMC) (CMC Daicel 1120 commercially available from Daicel FineChem Ltd.) as a water-soluble polymer, and 4.6 mass % of polyethylene oxide (PEO) (molecular weight: 2,000,000) were mixed, and an appropriate amount of water as a dispersant was added and dispersed to form a slurry-like composite material. The slurry-like composite material was uniformly applied to a copper foil with a thickness of 10 μm and a Cu (commercially available from Nippon Kokuen Group) current collector deposited with carbon so that the amount of the 4,4'-biphenyldicarboxylic acid dilithium active material per unit area was 2.5 mg/cm$^2$ and heated and dried to produce a coating sheet. Then, the coating sheet was subjected to pressure press processing and punched into an area of 10 cm$^2$ to prepare a negative electrode. This was used as the electrode of Experimental Example 1.

Production of Bipolar Evaluation Cell

Here, 1.1 mol/L of LiPF$_6$ was added to a solvent in which ethylene carbonate (EC), dimethyl carbonate (DMC), and ethyl methyl carbonate (EMC) were mixed at a volume ratio of 30:40:30 to produce a non-aqueous electrolyte solution. The 4,4'-biphenyldicarboxylic acid dilithium negative electrode was used as a working electrode, the lithium metal foil (with a thickness of 300 μm) was used as a counter electrode, and a separator (commercially available from Toray Industries Inc.) impregnated with the non-aqueous electrolyte solution was interposed between both electrodes to produce a bipolar evaluation cell.

TABLE 1

| | Method of producing active material | XRD peak intensity ratio of electrode | | | | | IV resistance Ω |
|---|---|---|---|---|---|---|---|
| | | (300)/(111) | (300)/(011) | (100)/(111) | (100)/(011) | (100)/(300) | |
| Reference Example 1 | Spray drying method | 3.18 | 3.20 | 7.54 | 7.60 | 2.38 | 358 |
| Reference Example 2 | | 3.81 | 3.51 | 7.70 | 7.09 | 2.02 | 345 |
| Reference Example 3 | | 2.85 | 2.73 | 6.83 | 6.54 | 2.40 | 402 |
| Reference Example 4 | | 3.37 | 2.91 | 6.61 | 5.72 | 1.98 | 300 |
| Reference Example 5 | Solution mixing method | 1.77 | 0.89 | 0.35 | 0.18 | 0.20 | 507 |

Next, the type of the water-soluble polymer was changed to produce electrodes and evaluation results will be described for experimental examples. Here, Experimental Examples 2 to 4 correspond to examples and Experimental Examples 1, and 5 to 8 correspond to comparative examples. In Experimental Examples 1 to 8, the types of the water-soluble polymers used were different from each other, but the layered structures were the same, thereby the same Evaluation of Electrode Capacity and Electrode Resistance The capacity was checked using the bipolar evaluation cell and an SOC was adjusted. Measurement of the electrode capacity was performed in a voltage range of 0.5 V to 1.5 V, at a current value of 1.5 mA (equivalent to C/10) and at 25° C., and adjustment was then performed to an amount of Li occluded equivalent to an SOC of 75%. Thereafter, two 4,4′-biphenyldicarboxylic acid dilithium electrodes prepared under the same conditions were made to face each other with a separator therebetween to produce a symmetric cell. The electrolyte solution was the non-aqueous electrolyte solution in which 1.1 mol/L of $LiPF_6$ was added to a mixed solvent of EC/DMC/EMC. In addition, the electrode resistance was measured according to measurement of the AC impedance using the symmetric cell. The AC impedance was measured using an AC impedance analyzer (Agilent 4294A) at an open circuit voltage, in a frequency range of 100 mHz to 10 kHz, at an applied voltage of 10 mV and at 25° C., and the electrode resistance was determined from the arc of Nyquist plots.

Experimental Examples 2 to 7

Symmetric cells of Experimental Examples 2 to 7 were prepared in the same manner as in the symmetric cell of Experimental Example 1 except that compositions shown in Table 2 were added. Electrode capacities and electrode resistances of Experimental Examples 2 to 7 were obtained in the same manner as in Experimental Example 1.

Results and Considerations

Figure 4:
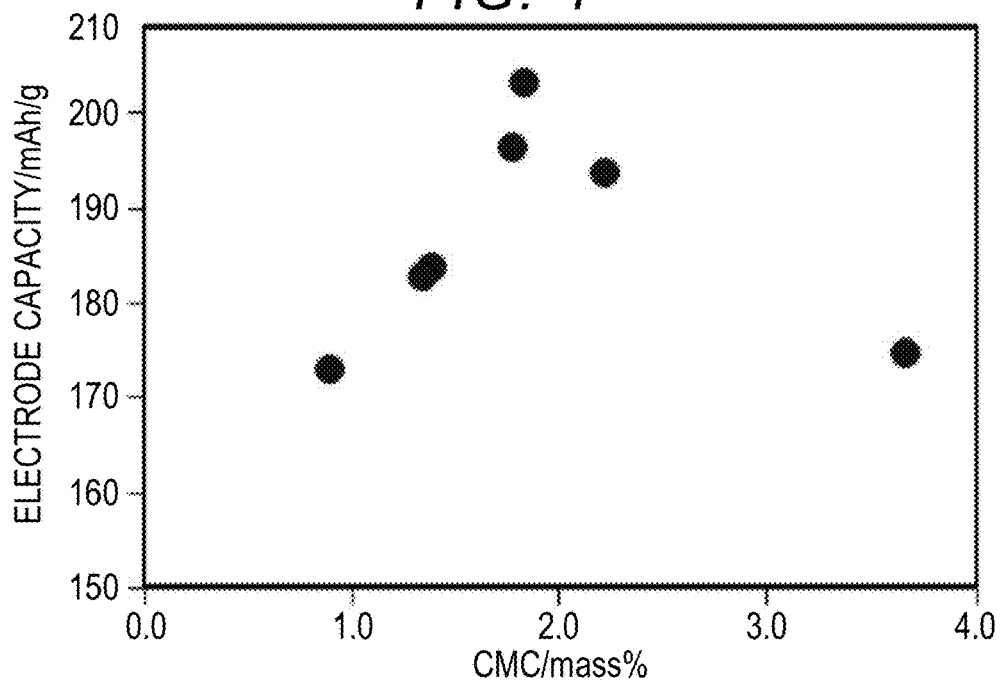
FIG. 4 is a graph showing the relationship between a proportion of CMC and an electrode capacity.
Figure 5:
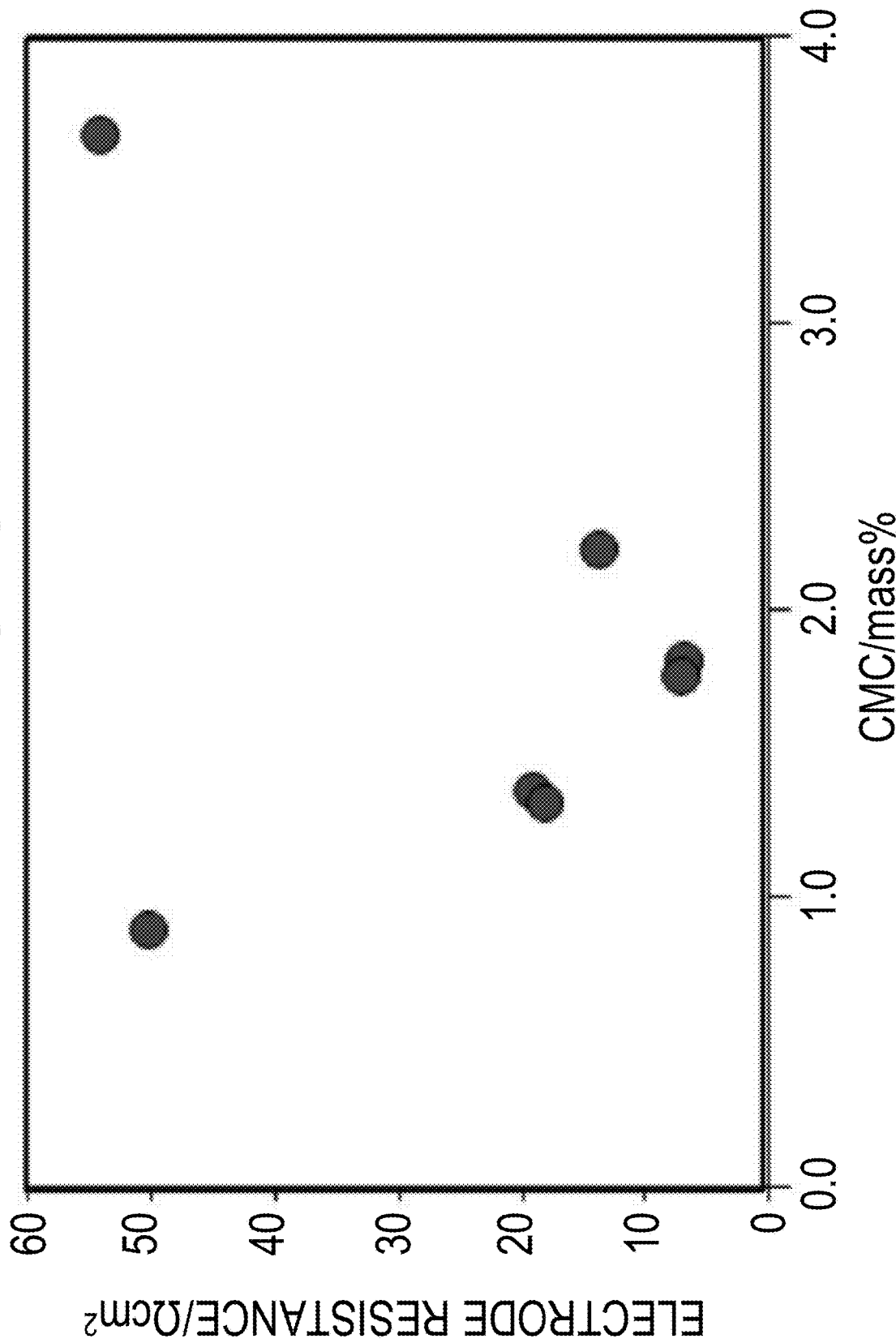
FIG. 5 is a graph showing the relationship between a proportion of CMC and an electrode resistance.

FIG. 4 is a graph showing the relationship between a proportion of CMC and an electrode capacity. FIG. 5 is a graph showing the relationship between a proportion of CMC and an electrode resistance. The electrode composition (mass %), the electrode capacity (mAh/g) and the electrode resistance ($\Omega cm^2$) of samples are summarized in Table 2. As shown in Table 2, and FIGS. 4 and 5, it was found that, in the electrode using a layered structure synthesized by a spray drying method, the electrode capacity and the electrode resistance changed according to an amount of CMC added. In addition, it was found that, when the proportion of CMC was in a range of 1.5 mass % or more and 3.5 mass % or less, and more preferably in a range of 1.8 mass % or more and 2.5 mass % or less with respect to the whole of the active material, the conductive material and the water-soluble polymer, the electrode capacity was improved, and the electrode resistance decreased. In addition, when PEO was added to the electrode composite material, coating properties were improved, and the electrode composite material layer was formed on the current collector more uniformly. It was inferred that the range of PEO was preferably 6.0 mass % or more and 9.0 mass % or less with respect to the whole of the active material, the conductive material and the water-soluble polymer. In addition, PEO with a molecular weight of 500,000 and PEO with a molecular weight of 2,000,000 were used for tests, and more favorable results were obtained with PEO with a molecular weight of 2,000,000. Thus, it was inferred that PEO with a molecular weight range of 500,000 or more was more preferable.

TABLE 2

| | Electrode composition | | | | Electrode capacity mAh/g | Electrode resistance $\Omega cm^2$ |
|---|---|---|---|---|---|---|
| | Bph mass % | C mass % | CMC mass % | PEO mass % | | |
| Experimental Example 1 | 73.4 | 18.3 | 3.7 | 4.6 | 174.5 | 54 |
| Experimental Example 2 | 66.7 | 22.2 | 2.2 | 8.9 | 193.5 | 13.6 |
| Experimental Example 3 | 73.4 | 18.3 | 1.8 | 6.4 | 203.0 | 6.7 |
| Experimental Example 4 | 71.4 | 17.9 | 1.8 | 8.9 | 196.2 | 6.9 |
| Experimental Example 5 | 78.3 | 13.8 | 1.4 | 6.5 | 183.6 | 19 |
| Experimental Example 6 | 76.2 | 13.5 | 1.3 | 9.0 | 182.7 | 18 |
| Experimental Example 7 | 81.1 | 9.0 | 0.9 | 9.0 | 172.7 | 50 |

1) Bph: 4,4′-biphenyldicarboxylic acid dilithium (synthesized by a spray drying method), C: carbon black, CMC: carboxymethyl cellulose, PEO: polyethylene oxide It should be noted that the present disclosure is not limited to the following examples, and can be implemented in various forms without the technical scope of the present disclosure.

The present disclosure can be used in the fields of battery industry.

What is claimed is:

1. A power storage device electrode comprising:
a layered structure, as an electrode active material, having an organic framework layer containing an aromatic dicarboxylic acid anion and an alkali metal element layer in which alkali metal elements are coordinated to oxygen atoms contained in a carboxylic acid anion of the aromatic dicarboxylic acid anion to form a framework,
wherein, in the whole of the electrode active material, a conductive material, and a water-soluble polymer containing at least carboxymethyl cellulose, the carboxymethyl cellulose is contained in a range of 1.5 mass % or more and 3.5 mass % or less, and at least one of following conditions (1) to (5) is satisfied:
(1) a peak intensity ratio P(300)/P(111) of a peak intensity of (300) with respect to a peak intensity of (111) when the power storage device electrode is subjected to X-ray diffraction measurement is 2.0 or more,
(2) a peak intensity ratio P(300)/P(011) of the peak intensity of (300) with respect to a peak intensity of (011) in the X-ray diffraction measurement is 2.0 or more,
(3) a peak intensity ratio P(100)/P(111) of a peak intensity of (100) with respect to the peak intensity of (111) in the X-ray diffraction measurement is 6.0 or more,
(4) a peak intensity ratio P(100)/P(011) of the peak intensity of (100) with respect to the peak intensity of (011) in the X-ray diffraction measurement is 5.0 or more, and
(5) a peak intensity ratio P(100)/P(300) of the peak intensity of (100) with respect to the peak intensity of (300) in the X-ray diffraction measurement is 1.5 or more.

2. The power storage device electrode according to claim 1, wherein
the power storage device electrode contains the carboxymethyl cellulose in a range of 1.8 mass % or more and 2.5 mass % or less.

3. The power storage device electrode according to claim 1, wherein
the water-soluble polymer contains polyethylene oxide.

4. The power storage device electrode according to claim 3, wherein the power storage device electrode contains the polyethylene oxide as the water-soluble polymer in a range of 6 mass % or more and 9 mass % or less.

5. The power storage device electrode according to claim 1, wherein the power storage device electrode has the layered structure including a structure represented by at least one of Expressions (1) to (3):

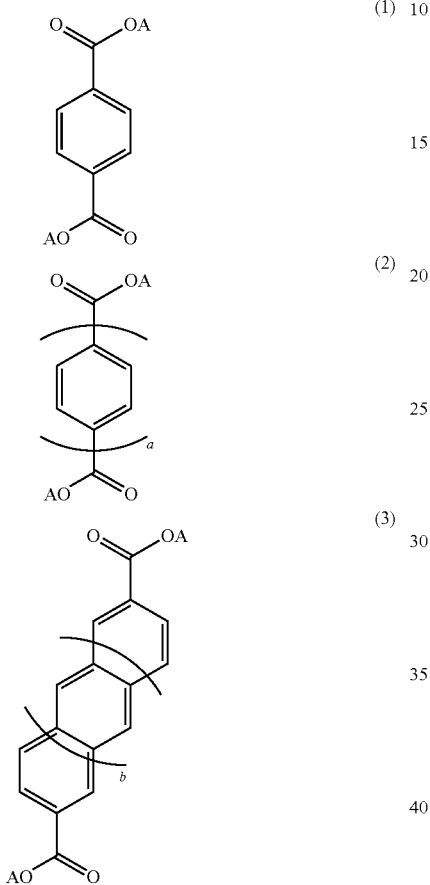

wherein, a is an integer of 2 or more and 5 or less, b is an integer of 0 or more and 3 or less, and each of aromatic compounds represented by Expressions (1) to (3) may have a substituent and a hetero atom in each of the structures, and A is an alkali metal.

6. A power storage device comprising:
a negative electrode which is the power storage device electrode according to claim 1;
a positive electrode containing a positive electrode active material; and
an ionic conductive medium which is interposed between the positive electrode and the negative electrode to conduct ions.

7. The power storage device according to claim 6, wherein the positive electrode contains at least one of a transition metal complex oxide containing lithium and an activated carbon with a specific surface area of 1,000 m²/g or more as the positive electrode active material.

8. A method of producing a power storage device electrode, comprising:
spray drying a preparation solution in which aromatic dicarboxylic acid anions and alkali metal cations are dissolved using a spray drying device and thus precipitating a layered structure having an organic framework layer containing the aromatic dicarboxylic acid anions and an alkali metal element layer in which alkali metal elements are coordinated to oxygen atoms contained in a carboxylic acid anion of the organic framework layer to form a framework;
using the layered structure as an electrode active material and obtaining an electrode composite material by mixing carboxymethyl cellulose in a range of 1.5 mass % or more and 3.5 mass % or less with respect to the electrode composite material containing the electrode active material, a conductive material, and a water-soluble polymer containing at least the carboxymethyl cellulose; and
applying the electrode composite material on a current collector such that an electrode composite material layer is formed.

9. The method according to claim 8, wherein the carboxymethyl cellulose is added in a range of 1.8 mass % or more and 2.5 mass % or less with respect to the electrode composite material.

10. The method according to claim 8, wherein polyethylene oxide as the water-soluble polymer is added to the electrode composite material.

11. The method according to claim 10, wherein the polyethylene oxide is added in a range of 6 mass % or more and 9 mass % or less with respect to the electrode composite material.

12. The method according to claim 8, wherein the layered structure including a structure represented by at least one of Expressions (1) to (3) is precipitated:

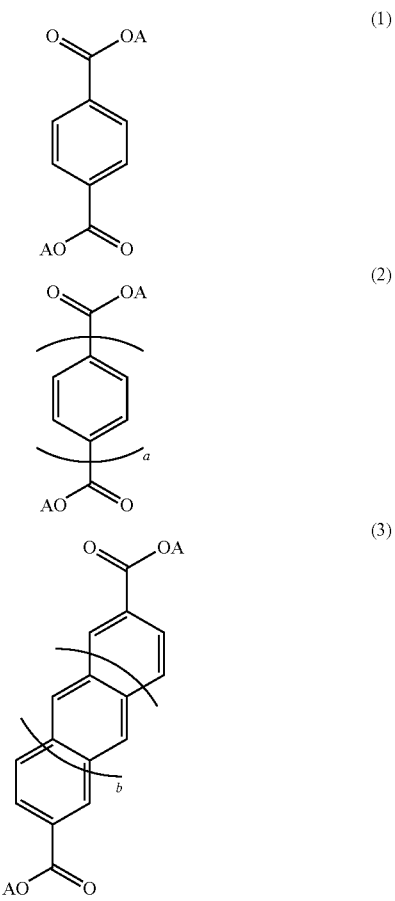

wherein, a is an integer of 2 or more and 5 or less, b is an integer of 0 or more and 3 or less, and each of aromatic compounds represented by Expressions (1) to (3) may have a substituent and a hetero atom in each of the structures, and A is an alkali metal.

\* \* \* \* \*